March 7, 1972 J. V. McGUIRE ET AL 3,647,602

SELECTIVE ARTICLE LABELING CONTROL FORM

Filed Nov. 10, 1969 7 Sheets-Sheet 1

INVENTOR.
JOHN V. MC GUIRE
DONALD W. WATSON
BY
Frederick E. McMullen
ATTORNEY

SELECTIVE ARTICLE LABELING CONTROL FORM

United States Patent Office 3,647,602
Patented Mar. 7, 1972

3,647,602

SELECTIVE ARTICLE LABELING CONTROL FORM

John V. McGuire, Deerfield, and Donald W. Watson, Arlington Heights, Ill., assignors to Xerox Corporation, Rochester, N.Y.

Filed Nov. 10, 1969, Ser. No. 875,006
Int. Cl. B43m *11/00*
U.S. Cl. 156—528 3 Claims

ABSTRACT OF THE DISCLOSURE

An article labeling system including article supply means; an addressing machine with article labeling head, said labels being in the form of an endless sheet-like piece having at least one label row with a control tape portion bearing control data for individual labels extending therealong; and means for operating the labeling system in accordance with the control data on the label form control tape.

This invention relates to an article labeling system, and more particularly, to a control means for article labeling systems.

In present day labeling systems, the computer finds increasing use as the source of label information, such as the mailing lists used by magazine subscription services. In this type of application, use of the computer is extremely advantageous since the computer permits ready updating of the mailing list in addition to facilitating retrieval of the mailing list information, the latter being in the form of computer printout. However, using the computer simply to provide on demand, up-to-date mailing lists does not take advantage of the capacity and ability of the computer to provide numerous other information that could further enhance the efficiency of a labeling system. For example, the computer can be used to identify particular classes of persons in a mailing program, such as persons whose subscriptions are expiring, or persons who are doctors, etc. Further, a computer can be programmed to reflect changes in address, normally changes in Zip Code, to enable the labeled articles to be sorted according to destination, or a computer can provide control data that will enable certain quantities of unlabeled articles to be coupled with a single labeled article destined for the same customer. It would be advantageous therefore if some of the potential inherent in computer-sourced labeling systems might be more efficaciously used.

It is a principal object of the present invention to provide a new and improved labeling system.

It is an object of the present invention to provide, in an adhesive based labeling system incorporating displaceable adhesive applying means, means for regulating the adhesive applying means to apply adhesive to predetermined ones of the labels in accordance with instructions on the label supply form itself.

It is an object of the present invention to provide a new and improved labeling apparatus adapted to void predetermined labels in accordance with control information carried on a disposable portion of the label form.

It is an object of the present invention to provide an improved control for labeling systems selectively operable to prevent or at least postpone transfer of selected labels to the articles being labeled.

This invention relates to an article labeling system, the combination comprising; a labeling head with a movable label transfer wheel; means to feed articles to be labeled to the labeling head; a source of labels comprising a sheet-like form having bodies of label information thereon representing individual labels, the labels being arranged in at least one longitudinally extending row; means for feeding the label form to the labeling head, the labeling head including means for separating the labels from the form to permit transfer of individual labels to the articles by the transfer wheel; means for conditioning the labels for physical transfer to the articles; the label form including an integral control section paralleling the label row and adapted to bear control data for regulating operation of the label conditioning means whereby only predetermined ones of the labels are transferred to the articles; and means for operating the label conditioning means in response to the control data.

Other objects and advantages will be apparent from the ensuing description and drawings in which.

Figure 1:
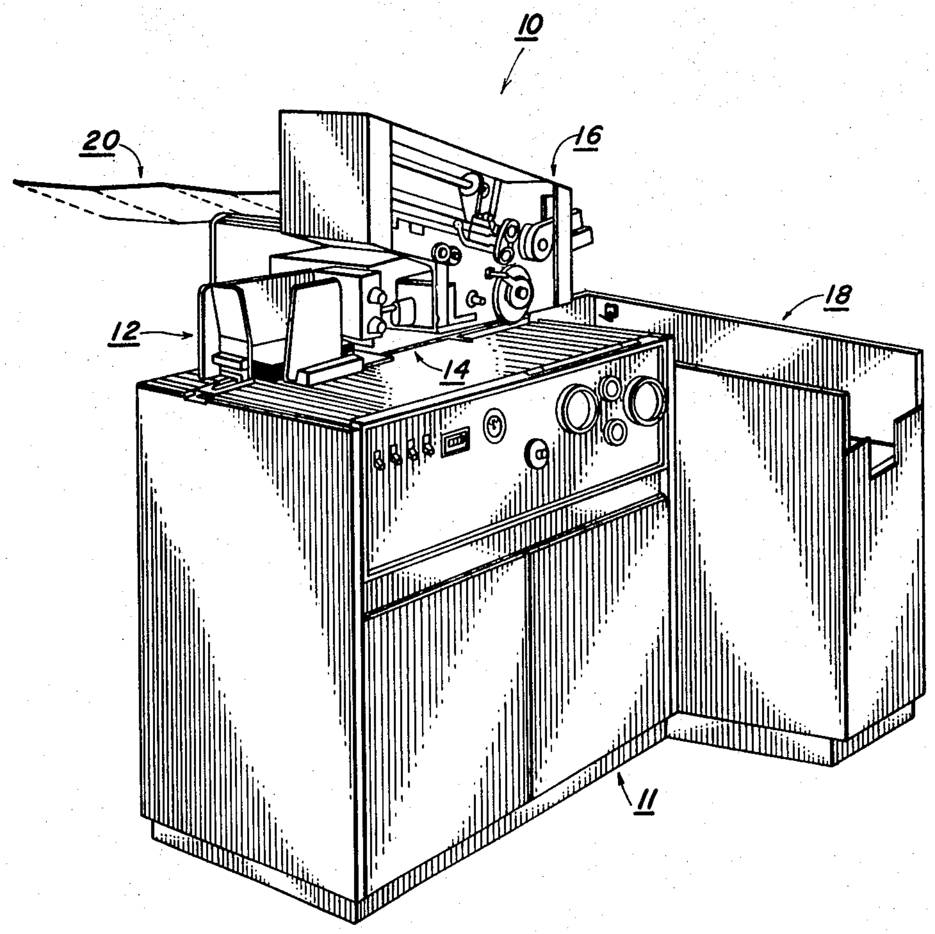
FIG. 1 is a perspective view of the article addressing machine and article stacker used in the labeling system of the present invention.

As used herein, "Zip Sort" is intended to refer to sorting or separating of articles in accordance with their geographical destination, normally on the basis of common Post Office Zip Code number. However, other geographical bases may be envisioned, for example, common town, common class, for example, doctors, age, etc.

"Label Skip" refers to skipping or voiding the labeling of one or more articles, the unlabeled articles normally being gathered, i.e. stacked, in a group with a single identifying label therefor. The identifying label may be placed on one of the articles of the group, i.e. the last, or on the wrapping or banding material for the article group.

"Article Skip" refers to skipping or voiding a label or labels, the voided label or labels normally being stored by the addressing machine for future use and reference.

In the accompanying drawings, the reference numeral 10 indicates an article labeling system of the type usable with the present invention. Article labeling system 10 includes an article addressing or labeling machine 11 shown here coupled to an article stacker 18. The addressing machine 11 has article feeder 12, article transport 14, and labeling head 16. The article labels are in the form of a sheet-like strip 20, called a label form, which is normally generated by computer 22. As will appear, a portion 24 of label form 20 is set aside for controlling instructions or indicia to operate labeling system 10.

As will be understood by those skilled in the art, the address information on label form 20, normally name and address, may be transferred to the articles being labeled by imprinting, or by other suitable image transfer processes, or by gluing the label itself directly onto the articles.

Figure 2:
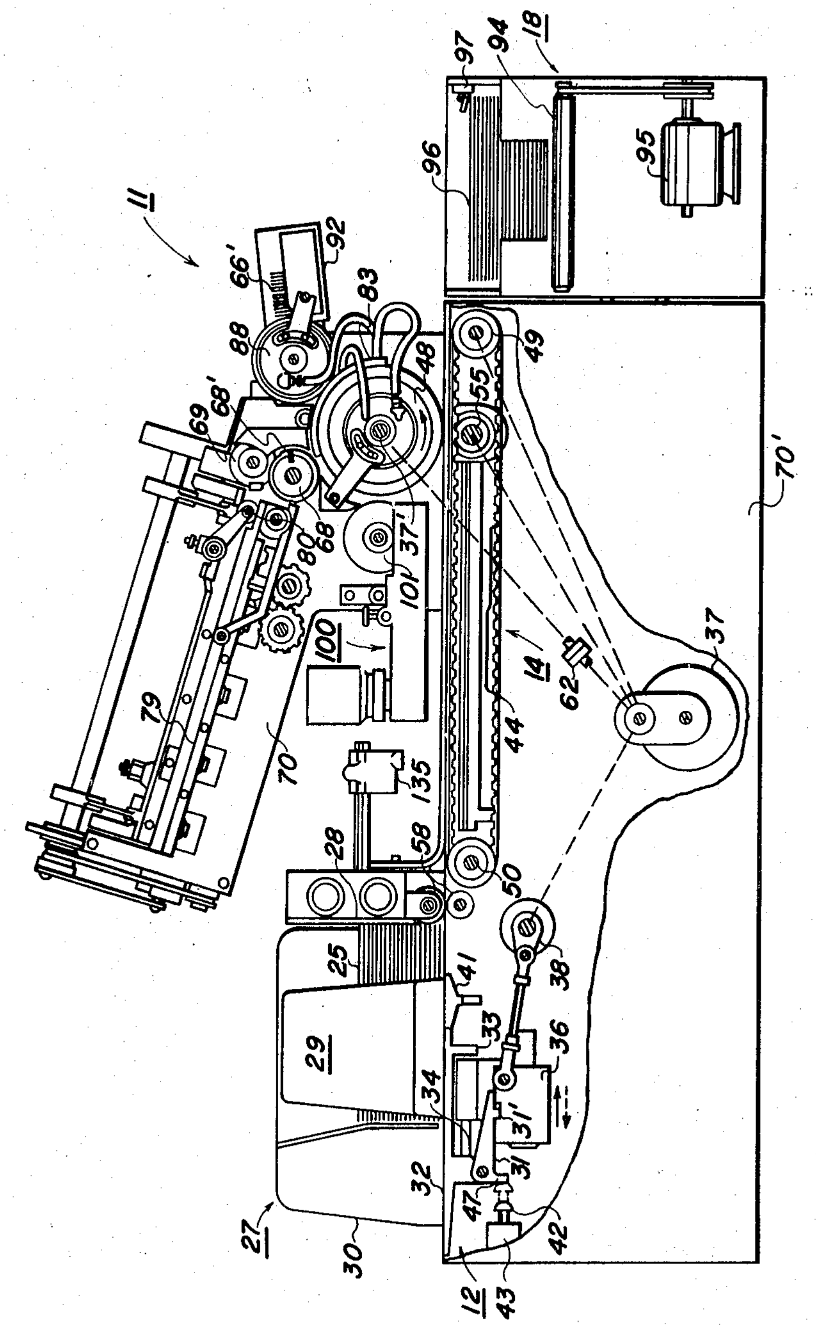
FIG. 2 is a view partially in section of the addressing machine and article stacker shown in FIG. 1.
Figure 3:
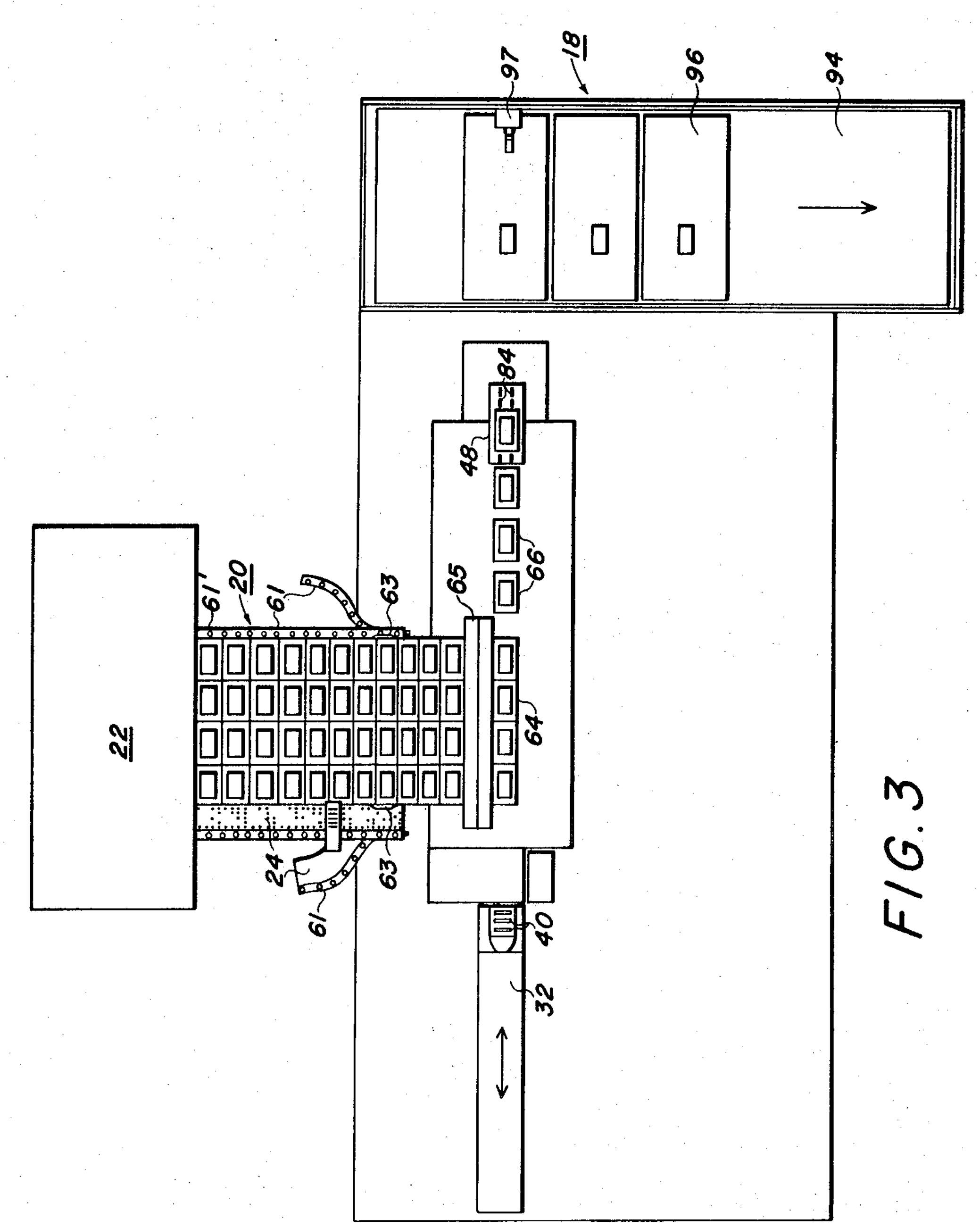
FIG. 3 is a top plan view of the addressing machine and article stacker shown in FIG. 1 with the label supply means.

Referring particularly to FIGS. 2 and 3, addressing machine 11 has a supply magazine 27 for articles 25 to be labeled, magazine 27 including upstanding front wall or gate 28, sides 29, and rear wall 30. It is understood that articles 25 may comprise envelopes, magazines, newspapers, or the like. The gate 28 is spaced a preset distance above feeder shuttle 32 to provide controlled article feeding, normally one article at a time. Magazine 27 is preferably adjustable in size to permit various sized articles 25 to be accommodated.

Article feeder 12 has a reciprocable shuttle 32 adapted on each forward stroke thereof (the direction indicated by the solid line arrow) to carry the bottommost article in magazine 27 forward under gate 28 into the nip of feed roll pair 58. Shuttle 32 consists of a plate-like member having depending journals 33 for supporting shuttle 32 on stationary rods 34. Shuttle 32 is driven by a reciprocable slider 36 through drive latch 31 pivotally secured to shuttle 32. Latch 31 has a driving lug 31' normally disposed within a suitable driving recess in slider 36. Slider 36 is reciprocated by motor 37 through a suitable eccentric mechanism 38. To stop shuttle 32 and interrupt feed of articles 25 forward, a disconnect stop 42, which is movable into the path of movement of depending arm 47 of latch 31 on energization of solenoid 43, is provided. Stop 42, when moved forward, intercepts latch arm 47 as shuttle 32 returns (the direction shown by the dotted line arrow of FIG. 2), to swing latch 31 in a counterclockwise direction thereby separating drive lug 31' from slider 36 and stopping shuttle 32.

Shuttle 32 is preferably provided with suitable vacuum hold down ports 40 (shown in FIG. 3) adjacent the discharge end thereof. A control valve 41 controls the admission of vacuum to ports 40, control valve 41 serving to admit vacuum to ports 40 on the forward or feeding stroke of shuttle 32 (the direction of the solid line arrow) and to close off the vacuum on the return stroke of shuttle 32 (the direction shown by the dotted line arrow).

The feed roller pair 58 provided between shuttle 32 and belts 44 of article transport 14 serve to advance the articles 25 carried forward by shuttle 32 onto article transport 14. Article transport 14 comprises one or more feed belts 44 supported by drive and idler rollers 49, 50 respectively. Roller 49 is driven by motor 37 through suitable drive means (not shown).

To support articles 25 during the labeling operation, there is provided opposite label transfer wheel 48 a resilient pressure roller 55, the periphery of which is substantially level with that of feed belt 44. As will appear, roller 55 cooperates with land portion 83 of transfer wheel 48 to transfer label information to articles 25 carried therepast by feed belt 44 of article transport 14. Pressure roller 55 is driven by motor 37 at the same speed as article transport 14 through suitable driven means (not shown).

Referring to FIGS. 1–4 inclusive, labeling head 16 includes a main support 70 which is preferably both vertically and horizontally adjustable relative to the base portion 70' of addressing machine 11. Support 70 carries a plurality of rotatable idler wheels 71 (seen in FIG. 4) which cooperate with interior support wheels (not shown) and a pair of outer driving sprockets 73 to advance label form 20 toward labeling head 16. Sprockets 73, which are suitably supported on shaft 52, have teeth 73' engageable with perforations 61' in margins 61 of label form 20.

Figure 5:
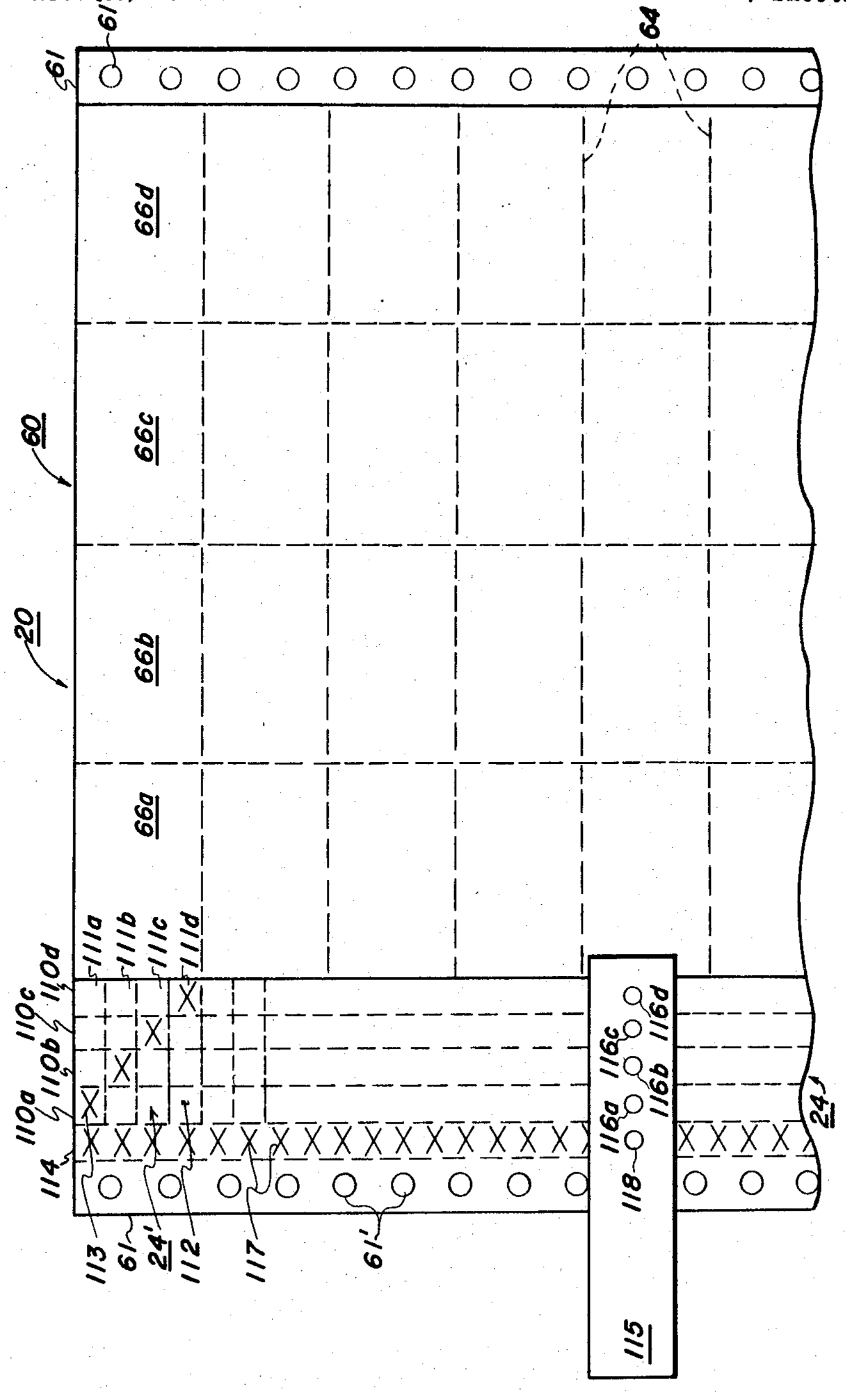
FIG. 5 is an enlarged view of a label form adapted to be used with the labeling system of the present invention.

Label form 20, which is best seen in FIGS. 3 and 5 comprises label section or area 60, control strip 24, and opposite side margins 61. As will appear, control strip 24 and margins 61 are cut from form 20 by rotary knives 63 as form 20 is advanced toward labeling head 16. Form 20, sans control strip 24 and margins 61, is thereafter cut cross-wise into lengths 64 by guillotine 65. The label lengths 64 (seen best in FIG. 3), which are then fed sideways to transfer wheel 48, are cut crosswise into individual labels 66 by roller cutter 68.

Figure 4:
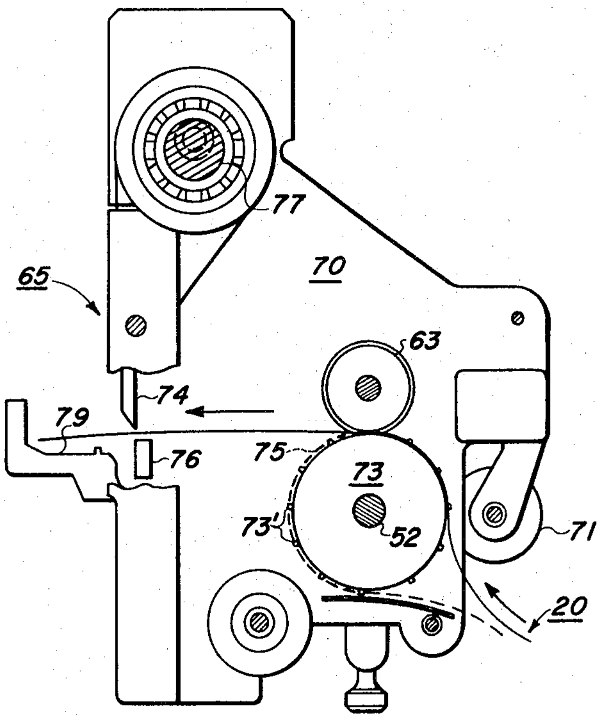
FIG. 4 is an enlarged view showing the label feeding and cutting mechanism for the addressing machine shown in FIG. 1.

As best seen in FIG. 4, rotary knives 63 have coacting shear rollers 75 operatively supported therebelow on shaft 52. Knives 63 and rollers 75 coact to trim control strip 24 and the opposite margin 61 from label form 20 as the form 20 passes between knives 63 and rollers 75. Shaft 52 is intermittently driven by suitable means (not shown) to feed label form 20 forward as required.

Guillotine 65 comprises a reciprocable knife blade 74 with coacting stationary shear blade 76 disposed therebelow. Knife blade 74 is intermittently reciprocated by means of eccentric 77 to cut form 20 into lengths 64, which rest in downwardly inclined chute 79. Eccentric 77 is rotated in timed relationship with sprocket wheels 73.

As seen best in FIGS. 2 and 3, the label lengths 64 are carried along chute 79 toward transfer wheel 48 by pinch roller pair 80, cutting and anvil rollers 68, 69 cooperating to cut length 64 into individual labels 66. Cutting roller 68 has a suitable knife member 68' mounted thereon which cooperates with anvil roller 69 to cut the label length 64.

Label transfer wheel 48, which is suitably supported for rotation on support 70, has a radially projecting land 83 onto which individual labels 66 from cutting and anvil rollers 68, 69 are carried into transfer relation with articles 25 passing therebelow on article conveyor 14. Land 83 is provided with suitable vacuum holddown ports 84 selectively connected through suitable valve means (not shown) with a suitable vacuum source to hold the individual labels on land 83 while transfer wheel 48 rotates. Land 83 may include heating means (not shown) to facilitate transfer of the label image where thermal type label imprinting is utilized.

A pick-off wheel 88 is mounted on support 70 adjacent transfer wheel 48 for rotation in timed relation with transfer wheel 48. Wheel 88 has holddown ports (not shown) provided therein with suitable valve means (not shown) for admitting vacuum thereto so as to carry used labels from transfer wheel 48 to label storage container 92. Container 92 serves to store unused or non-transferred labels, the latter in the case where the label information is transferred by imprinting, for re-use or other disposition. It is understood that where the labels 66 are physically attached to the articles 25, wheel 88 and container 92 are normally unused and may be dispensed with.

The operating components of labeling head 16, including label transfer wheel 48, label pickoff wheel 88, cutting rollers 68, 69, pinch roller pair 80, eccentric 77, and drive shaft 52, are driven by motor 37 through suitable electromagnetic clutch means 62.

Article stacker 18 has one or more endless conveyor belts 94 arranged opposite to and below the discharge side of article transport 14. Accordingly, articles on transport 14 drop downwardly onto conveyor belts 94 one atop the other in stacks 96. In the arrangement shown, stacker 18 is disposed generally at right angles to article transport 14. A suitable drive motor 95 is provided to index stacker 18. To limit the maximum height of the stacks 96 and prevent over-stacking, stacker 18 has a height sensor 97. As will appear, sensor 97 serves, when the stack of labeled articles reaches a predetermined height, to stop shuttle 32 and shut down labeling head 16 while actuating motor 95 to index conveyor belts 94 one article stack and present a fresh conveyor belt surface for stacking. Other article stacking devices and arrangements may be contemplated.

Where labels 66 are physically attached to the articles 25, a suitable source of adhesive or glue 100 may be provided. An applicator wheel 101 is arranged adjacent transfer wheel 48 so as to contact the underside of the labels carried therepast on land 83 of transfer wheel 48 as transfer wheel carries the label from cutting roller 68 into contact with the article therebelow on article conveyor 14. A suitable wiper (not shown) may be provided to regulate the amount of glue entrained on wheel 101. Where the label supply comprises pre-cut or used labels 66' in container 92, the vacuum porting and/or valving sequence of transfer wheel 48 and pickoff wheel 88 are changed to enable pickoff wheel 88 to withdraw labels from container 92 and transfer the pre-cut labels 66' onto land 83 of transfer wheel 48 for gluing thereof to articles 25.

Referring particularly to FIG. 5 of the drawings, the label form 20 there shown has individual informational areas, commonly referred to as labels 66, grouped side by side four abreast. For convenience of explanation, the individual labels have been designated **66*a*, 66*b*, 66*c*, 66*d*. As can be understood, however, the number of labels across may vary from one to any convenient number. Control strip 24, which extends along one side of form 20, is of a width sufficient to provide an imaginary control track 110*a*, 110*b*, 110*c* and 110*d* (shown in phantom outline in the drawings) for each of the labels 66*a*, 66*b*, 66*c*, 66*d*, respectively as well as a timing track 114**.

For purposes of explanation, control strip 24 with timing track 114 may be imagined as subdivided into four transverse width **111*a*, 111*b*, 111*c*, 111*d*, representing each label 66*a*, 66*b*, 66*c*, 66*d* respectively. When envisioned with control tracks 110*a*, 110*b*, 110*c*, and 110*d*, and timing track 114, there is formed an imaginary grid 24' of box-like spaces 112 opposite each label length 64. The box-like spaces 112 of grid 24' are available for addressing system controlling data, such as cyphers 113 from computer 22. Timing cyphers 117 are provided in the corresponding box-like areas of timing track 114**.

A suitable reader 115 for scanning control strip 24, is provided, preferably upstream of rotary knives 63. Reader 115 comprises any suitable commercially available scanning device for sensing cyphers 113, 117 on tape 24. Reader 115 has individual heads **116*a*, 116*b*, 116*c* and 116*d* for scanning control tracks 110*a*, 110*b*, 110*c*, and 110*d* respectively, and head 118 for scanning timing track 114**.

Figure 6:
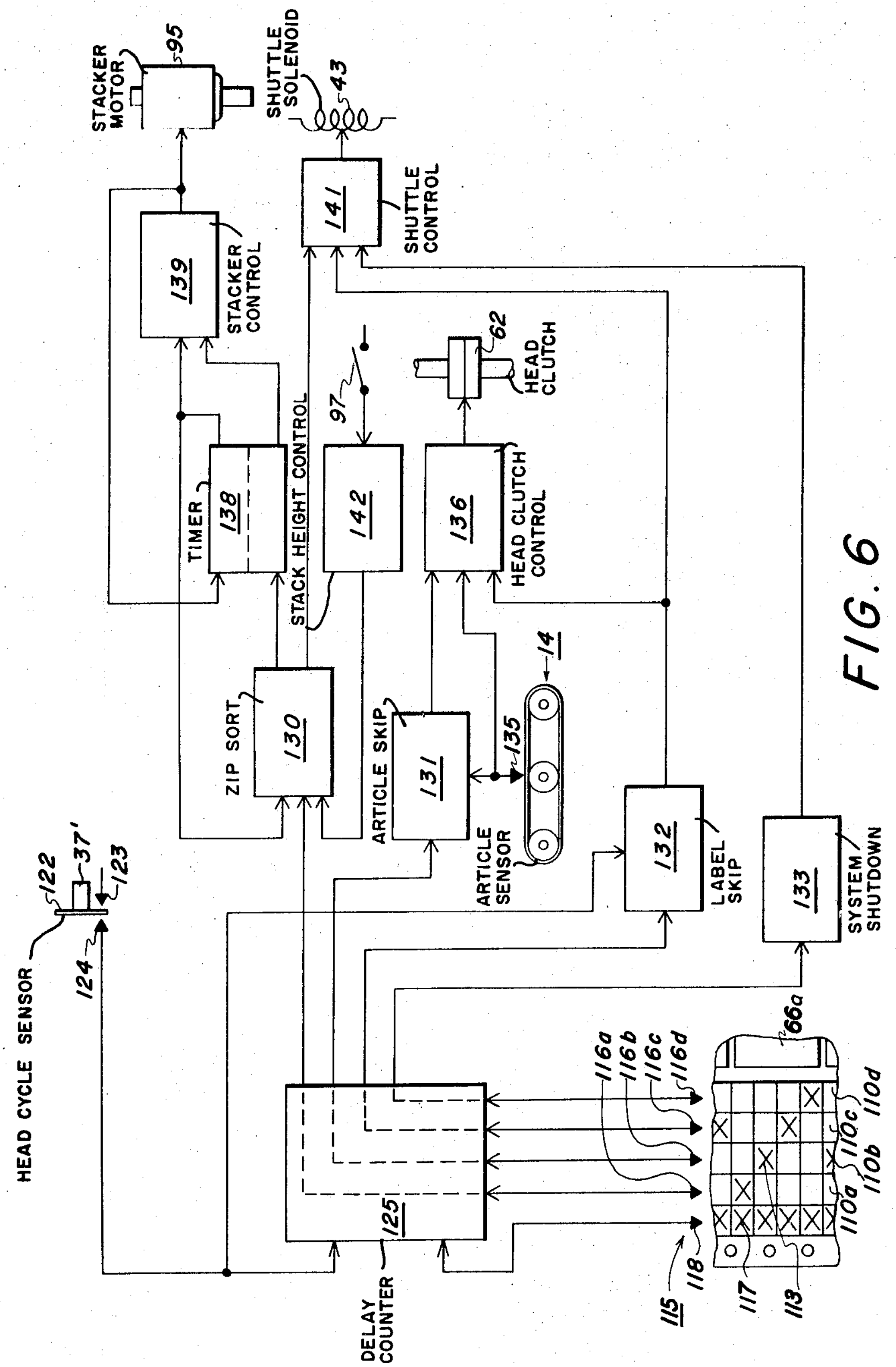
FIG. 6 is a schematic diagram of the control arrangement for the labeling system of the present invention.

Referring to FIG. 6, the output of scanning heads **116*a*, 116*b*, 116*c*, 116*d* is fed to a suitable delay counter 125 for storage pending the arrival of the label associated therewith at transfer wheel 48 of labeling head 16. A first stage of counter 125 is driven by timing head 118 in response to advance of label form 20 forward toward labeling head 16. This accommodates the period required for form 20 to reach guillotine 65 following scanning thereof by reader 115. A second stage of counter 125 is driven in accordance with cyclic operation of labeling head 16 from photoelectric type pickup 124. This accommodates the period required to cut and feed individual labels 66 from guillotine 65 to transfer wheel 48**.

Pickup 124 is arranged opposite an apertured tach wheel 122. Tach wheel 122 is carried on shaft 37' of labeling head 16 for rotation in conjunction with operaation of labeling head 16. A suitable light source 123 is disposed on the opposite side of wheel 122, light 123 serving to trigger pickup 124 each time an apertured portion of tach wheel 122 comes opposite pickup 124. Delay counter 125 accordingly functions to store the control signals from heads **116*a*, 116*b*, 116*c* and 116*d* of reader 115 pending arrival of the labels at transfer wheel 48 of labeling head 16**.

Suitable control circuits 130, 131, 132, for "Zip Sort," "Article Skip," and "Label Skip," respectively are provided. Additionally, a control circuit 133 to shutdown the article labeling system 10 is provided. It may be seen in this arrangement that "Zip Sort" is based on data appearing in control track **110*a*, "Article Skip" on data appearing in track 110*b*, "Label Skip" on data appearing in track 110*c*, and system shutdown on data appearing in track 110*d***.

"Zip Sort" circuit 130 controls a circuit 141 for operating shuttle disconnect solenoid 43. As explained, solenoid 43 serves to interpose stop 42 in the path of movement of latch arm 47 thereby disengaging latch 31 from slider 36 and stopping shuttle 32. Circuit 130 additionally controls, through timer 138, operation of stacker 18.

An article sensor 135 is provided. Sensor 135 is suitably disposed above article transport 14 (see FIG. 2) so as to respond to the feeding of articles by transport 14 to labeling head 16. The operating circuit 136 for labeling head drive clutch 62 is controlled by sensor 135 to effect stopping of labeling head 16 when the feed of articles 25 thereto interrupted.

It is understood that the location of sensor 135 relative to labeling head 16 may require suitable delay means in the sensing circuit to delay shutdown of labeling head 16 while articles then on article transport 14 are processed.

Timer 138 comprises any suitable two-stage timing circuit adapted to control, through stacker circuit 139, starting and stopping of stacker drive motor 95. As will be understood, actuation of stacker 18 is normally delayed while articles remaining on article transport 16 following stopping of feeder shuttle 32 are processed. The first stage of timer 138 serves to provide this delay by delaying, for a predetermined interval, transmittal of the actuating signal from "Zip Sort" circuit 130 to stacker control circuit 139. The second stage of timer 138 tolls the interval required for stacker 18 to index one cycle. Following that interval, a signal from timer 138 stops stacker drive motor 95. At the same time, timer 138 resets "Zip Sort" circuit 130 to permit re-starting of the addressing machine 11.

"Article Skip" circuit 131 comprises a suitable counter, which is preferably adjustable, driven or indexed in response to article movement, as by article sensor 135. "Article Skip" circuit 131, which is preset to skip or pass a predetermined number of articles 25 unlabeled past labeling head 16, works through clutch circuit 136 to disengage clutch 62 and stop labeling head 16 while the preset number of articles pass. Thereafter, the signal from circuit 131 re-engages clutch 62 to restart labeling head 16 and resume labeling operation.

"Label Skip" circuit 132 comprises a suitable adjustable counter, driven or indexed in response to cyclic operation of labeling head 16 as by pickup 124. Circuit 132 controls operation of article feeder shuttle 32, circuit 132 operating solenoid circuit 141 to interpose stop 42 and uncouple shuttle drive latch 31 to stop feeder shuttle 32 for a preset number of labeling head cycles. At the same time, the signal from circuit 132 inhibits clutch circuit 136 to prevent triggering of circuit 136 and disengagement of labeling head drive clutch 62 by sensor 135 due to the interruption in the feed of articles to labeling head 16. This permits labeling head 16 to transfer the unused label or labels from label transfer wheel 48 thereof to storage chute 92 via pickoff wheel 88.

System shutdown circuit 133 comprises suitable circuitry adapted when actuated to trigger solenoid circuit 141 and stop feeder shuttle 32 as described before. The resulting interruption in the feed of articles to labeling head 16 is responded to by sensor 135 which triggers clutch circuit 136 to disengage labeling head drive clutch 62 to stop labeling head 16. With both feeder shuttle 32 and labeling head 16 stopped, the labeling system 10 is effectively shutdown.

Circuit 142 serves, on a signal from stack height sensor 97, to trigger "Zip Sort" circuit 130 and stop addressing machine 11 and index stacker 18 as described before. Following the requisite time interval, timer 138 re-starts the addressing machine 11.

In the exemplary arrangement illustrated in FIG. 6, a cypher 113 appears in track **110*a* of label width 111*a*. This reflects a change in Zip Code with label 66*a* it being understood that label 66*a* may comprise the last label of a common Zip Code, or the first label of a common Zip Code, or the only label in a certain Zip Code. As label form 20 is advanced toward labeling head 16, and under reader 115, the signal from head 116*a* in response to the cypher is fed to delay counter 125 where it is held pending the arrival of label 66***a* at transfer wheel 48 of labeling head 16.

The pulse-like signal output generated by timing head 118 on advance of label form 20 forward drives or indexes the counter first stage to toll the interval required for the label length 64 incorporating the affected label 60*a* to reach guillotine 65. The second stage of counter 125, which is indexed in response to operation of labeling head 16 from photocell pickup 124, tolls the interval required for the particular label 66*a* to move from guillotine 65 onto label transfer wheel 48. When the affected label 66*a* reaches transfer wheel 48, the delayed signal from counter 125 actuates "Zip Sort" circuit 130. "Zip Sort" circuit 130 triggers solenoid circuit 141 to energize solenoid 43 and disengage drive latch 31 to stop feeder shuttle 32. Article sensor 135 senses interruption in the feed of articles 25 to labeling head 16 and triggers clutch circuit 136. Circuit 136 disengages labeling head drive clutch 62 to stop labeling head 16.

The signal from "Zip Sort" circuit 130 starts timer 138, and following an interval adequate to allow the last articles on article transport 14 to reach stacker 18, timer 138 triggers stacker circuit 139 to start stacker drive motor 95. Motor 95 drives stacker conveyor belts 94 to move the completed stack aside. Following a second timed interval, adequate to enable motor 95 to index stacker 18, a signal from timer 138 resets "Zip Sort" circuit 130 thereby de-energizing solenoid 43 and re-starting feeder shuttle 32. In addition, the signal from timer 138 resets stacker circuit 139 to stop stacker drive motor 95. With resumption in the feed of articles 25 to labeling head 16, sensor 135 resets circuit 136 to engage clutch 62 and re-start labeling head 16.

It is understood that the preceding description presumes the existence of a relatively short distance between article discharge gate 28 and labeling head transfer wheel 48 so that no appreciable lag exists between the time the signal from delay counter 125 actuates "Zip Sort" circuit 130, or circuits 131, 132, 133 for that matter, and the article to be labeled with the affected label reaches labeling head transfer wheel 48. Where the distance between gate 28 and transfer wheel 48 is such that one or more unlabeled articles are normally enroute to label transfer wheel 48 on article transport 14, delay counter 125 is adjusted to generate the control signal stored therein prior to the time the affected label reaches labeling head 16. This permits processing of the articles remaining on article transport 14 to be completed following stopping of shuttle 32. It is understood that where article sensor 135 is disposed proximate labeling head 16, labeling head 16 will remain operative until the last article on transport 14 is processed. Where sensor 135 is some distance upstream of labeling head 16, a suitable delay device may be used to delay the signal from sensor 135 pending completion of the processing of articles on transport 14.

It is appreciated that a cypher 113 at any of the remaining widths 111*b*, 111*c*, 111*d*, of track 110*a*, corresponding to labels 66*b*, 66*c*, 66*d* respectively, provides "Zip Sort" for that label as described above.

The presence of a cypher 113 in track 110*b*, as for example, in width 111*b* corresponding to label 66*b*, is responded to by scanning head 116*b*, the resulting signal being stored in delay counter 125. As described, counter 125 delays the signal to permit the label 66*b* to reach the transfer wheel 48 of labeling head 16. At that time, the signal from counter 125 actuates "Article Skip" circuit 131 which in turn triggers labeling head drive clutch circuit 136 to disengage clutch 62 and stop labeling head 16. "Article Skip" circuit 131 holds labeling head 16 stopped while a preset number of articles are carried by on article transport 14 to stacker 18. Thereafter, circuit 131 resets clutch circuit 136 to re-engage labeling head drive clutch 62 and resume labeling operation. It is understood that similar system operation results from a cypher in widths 111*a*, 111*c*, 111*d* of track 110*b* for the labels 66*a*, 66*c*, 66*d* associated therewith.

A cypher 113 in track 110*c*, for example, in width 111*c* for label 66*c*, calling for "Label Skip" and storing of the unused label, is responded to by scanning head 116*c*. The control signal from head 116*c* is stored by counter 125, and following the requisite delay, the delay signal from counter 125 actuates "Label Skip" circuit 132. Circuit 132 triggers solenoid circuit 141 to stop article feeder shuttle 32 in the manner described heretofore for a preset number of labeling head cycles. At the same time, the signal from circuit 132 inhibits sensor circuit 136 to neutralize article sensor 135.

With feeder shuttle 32 temporarily stopped, a gap results in the feed of articles to labeling head 16 and the label or labels fed to transfer wheel 48 during this period are unused. With the sustained operation of labeling head 16, these unused labels are transferred from wheel 48 to storage chute 92 by pickoff wheel 88. Following the predetermined number of machine cycles, "Label Skip" circuit 132 re-sets solenoid circuit 141 to re-start feeder shuttle 32 and resume labeling. A similar result obtains where cyphers 113 appear in widths 111*a*, 111*b*, 111*d* of control track 110*c*.

Where a cypher 113 appears in control track 110*d*, as for example, in width 111*d* thereof, the signal from scanning head 116*d*, following the requisite delay imposed by counter 125, actuates circuit 133. Circuit 133 triggers solenoid circuit 141 to stop feeder shuttle 32 as explained previously. With interruption in the feed of articles 25 to labeling head 16, sensor 135 triggers clutch circuit 136 to disengage labeling head drive clutch 62 and stop labeling head 16. Labeling system 10 is accordingly effectively shutdown. It is understood that suitable means (not shown) are provided to restart the machine.

Figure 7:
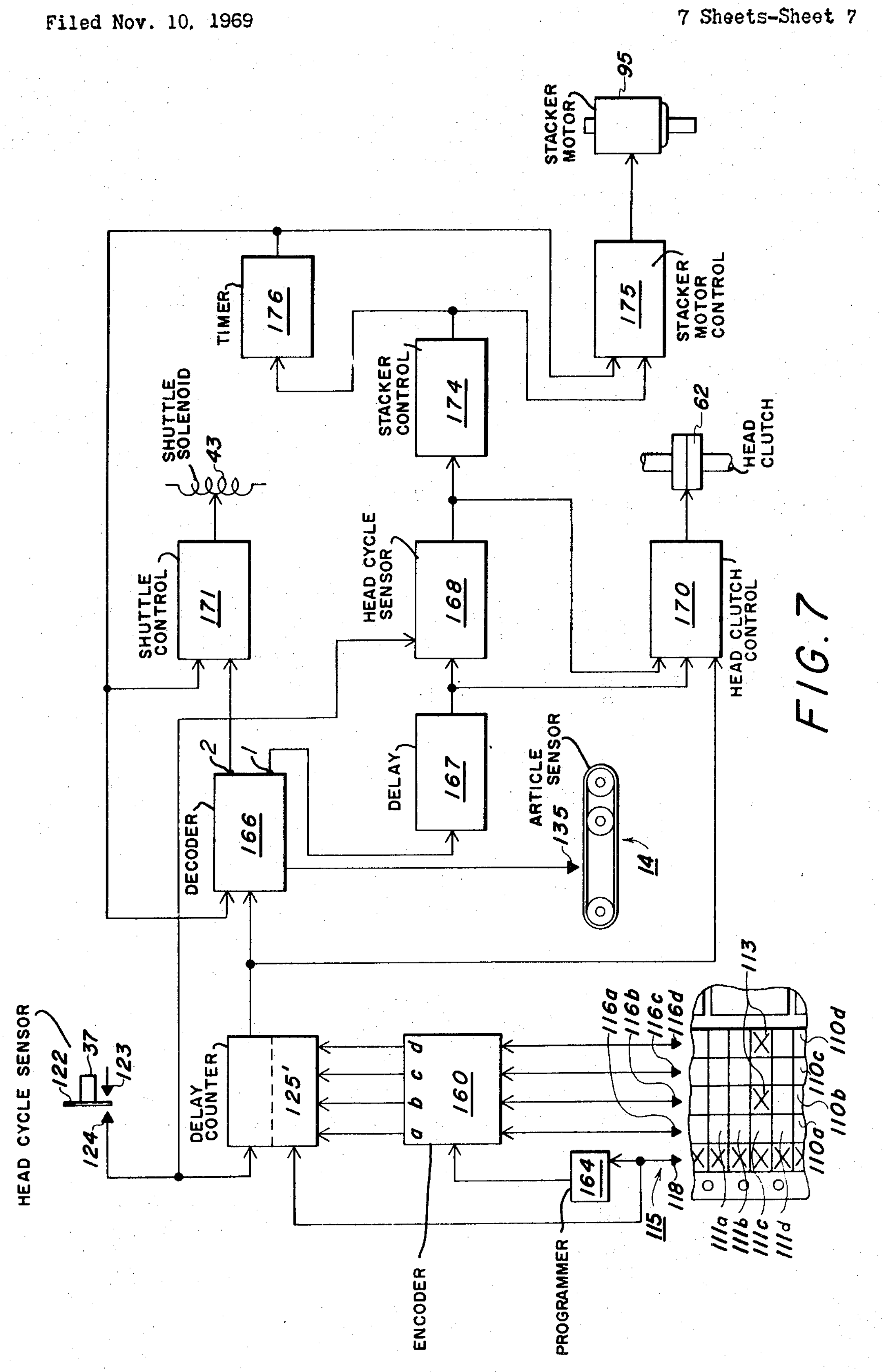
FIG. 7 is a schematic diagram of an alternate control arrangement for the labeling system of the present invention.

In the arrangement shown in FIG. 7, where like numerals refer to like parts, there is incorporated into control strip 24 of label form 20 a binary code system permitting addressing machinne 11 to generate bulk outputs, for example, various numbers of unlabeled articles for each common label. Here, each of the control tracks 110*a*, 110*b*, 110*c*, and 110*d* represent a selected numerical value with the label width 111*a*, 111*b*, 111*c* and 111*d* corresponding to the labels 66*a*, 66*b*, 66*c* and 66*d* respectively. In the exemplary arrangement shown, control tracks 110*a*, 110*b*, 110*c* and 110*d* represent integer additives 1, 2, 4 and 8 respectively. Other numerical values may however be contemplated.

In this embodiment, the output of scanning heads 116*a*, 116*b*, 116*c*, 116*d*, are fed to a suitable encoder 160 having multiple output gates *a*, *b*, *c*, *d*, representing each label 66*a*, 66*b*, 66*c*, or 66*d*, respectively.

Timing head 118 drives a suitable programmer 164 serving to index encoder 160 and correlate the output signal at gates *a*, *b*, *c*, *d* thereof with the imaginary label widths 111*a*, 111*b*, 111*c*, 111*d* being scanned by reader 115.

The output of encoder 160, which is representative of the specific cypher combination or count sensed by heads 116*a*, 116*b*, 116*c*, 116*d* of reader 115 for a specific label 66*a*, 66*b*, 66*c*, or 66*d*, is stored by delay counter 125' pending arrival of the particular label 66*a*, 66*b*, 66*c*, or 66*d* at transfer wheel 48 of labeling head 16. The signal from delay counter 125 is fed to decoder 166.

Decoder 166 consists of a suitable counter having staged output gates 1, 2. Following actuation, decoder 166, which is driven or indexed by article sensor 135, generates a first control signal at gate 1 on the next to the last article count ($n-1$) and a second control signal at gate 2 on the last article count ($n$). As will appear, the staged output of decoder 166 permits the last article of a given article count, which is to be labeled, to be distinguished from the unlabeled articles preceding it.

A suitable labeling head cycle counter 168, driven by photocell 124, is provided. Cycle counter 168 controls labeling head 16 through clutch circuit 170 to label the last article in a given article count. Cycle counter 168 is controlled from gate 1 of decoder 166 through a suitable delay circuit 167. Delay circuit 167 serves to accommodate the interval, if any, between the time the next to the last article is sensed by article sensor 135 and the time that article reaches labeling head 16.

Clutch circuit 170 operates labeling head drive clutch 62. Circuit 170 is controlled by delay counter 125, by decoder 166 via delay circuit 167, and by cycle counter 168.

A suitable operating circuit 171 for shuttle solenoid 43 is provided. The signal from gate 2 of decoder 166 controls circuit 171.

A stacker control circuit 174, operated by cycle counter 168 is provided. The signal from stacker control circuit 174 operates both stacker motor circuit 175 and a suitable timing circuit 176. Timing circuit 176 serves, following an interval adequate for stacker 18 to index one article stack, to shut down stacker 18 while resetting shuttle control circuit 171 and decoder 166 for the next cycle. In the exemplary arrangement shown in FIG. 7, a pair of cyphers 113 appear in the imaginary label width 11*c* of tracks 110*b*, 110*d*. This cypher arrangement calls for 10 articles (2+8) for the label 66*c* associated with label width 111*c*, the first nine of which are to be unlabeled. Label 66*c* is applied to the last or tenth article by labeling head 16 to address the resulting stack of unlabeled articles.

As label form 20 advances past reader 115 in response to the demands of labeling head 16, scanning heads 116*b*, 116*d* respond to the cyphers 113 to generate a predetermined signal at the input gates of encoder 160 representative of that particular cypher combination, i.e. 10. Programmer 164, which is indexed by timing head 118 with movement of label form 20, inhibits gates *a*, *b*, and *d* of encoder 160 while the control strip width 111*c* is being scanned. Accordingly, an output signal representative of the specific cypher combination sensed for label width 111*c*, appears at gate *c* of encoder 160. The signal from encoder 160 is held by delay counter 125' pending arrival of label 66*c* to labeling head transfer wheel 48.

Following the requisite delay, the control signal from delay counter 125' sets clutch circuit 170 to assure that labeling head drive clutch 62 is disengaged and labeling head 16 stopped. At the same time, the control signal from counter 125' sets decoder 166.

As articles 25 are carried forward by article transport 14 to labeling head 16 past sensor 135, the pulse-like signal from sensor 135 indexes or drives decoder 166. On feed of the last article, i.e. the tenth article forward, the signal at gate 2 of decoder 166 triggers solenoid circuit 171 to operate latch stop 42 and uncouple feeder shuttle 32 from driving slider 36. With feeder shuttle 32 stopped, feed of articles 25 to labeling head 16 is interrupted.

As the next to the last article moves past article sensor 135, a control signal appears at gate 1 of decoder 166 and following the delay imposed by circuit 167 to allow that article to pass labeling head 16, the signal from decoder 166 resets clutch circuit 170 to re-engage labeling head drive clutch 62 and start labeling head 16. At the same time, the signal from gate 1 of decoder 166 starts label cycle counter 168. With operation of labeling head 16, the next article, i.e. the tenth article, is labeled.

Following a single labeling head cycle, counter 168 triggers clutch control circuit 170 to again disengage drive clutch 62 and stop labeling head 16. At the same time, the signal from counter 168 actuates stacker control circuit 174 to trigger circuit 175 and start stacker drive motor 95 to index stacker 18. The signal from circuit 174 also starts timer 176 which, following an interval necessary for stacker 18 to remove the completed article stack, stops stacker drive motor 95 while resetting decoder 166 and solenoid control circuit 171 to restart article feeder shuttle 32.

It is understood that other cipher combinations will result in similar operation of addressing machine 11 to provide predetermined numbers of unlabeled articles with a single identifying labeled article. To prevent overstacking, a suitable stack height control, similar to that described in connection with the embodiment shown in FIG. 6 of the drawing, may be provided.

Figure 8:
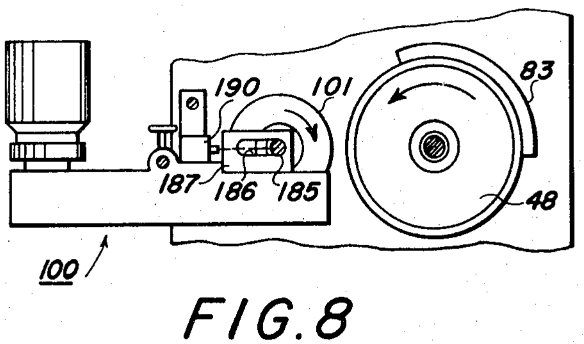
FIG. 8 is an enlarged view partially in section showing the details of the label adhesive applying means for the addressing machine shown in FIG. 1.

Referring to FIG. 8 of the drawings, where like numerals refer to like parts, a solenoid operated mechanism is there provided to enable glue wheel 101 to be temporarily held out of operating contact with land portion 83 of label transfer wheel 48. This permits addressing machine 11, when using glue wheel 101, to operate on the "Label Skip" mode.

In this arrangement, glue wheel 101 is supported on shaft 185 mounted in slot-like openings 186 in side supports 187. Supports 187 are in turn mounted on and supported by adhesive container 100. A solenoid 190, operatively connected to glue wheel support shaft 185, serves when energized to retract glue wheel shaft 185 and thereby draw glue wheel 101 out of the path of rotation of transfer wheel land 83 to prevent application of glue to the labels carried therepast on land 83. Suitable spring bias means (not shown) may be provided to return wheel 101 to an operative position adjacent transfer wheel 48 upon de-energization of solenoid 190. It is understood that "Label Skip" circuit 132 (see FIG. 6) would serve, when actuated, to operate solenoid 190 and withdraw glue wheel 101 in response to a control signal from scanning head 116*c* of FIG. 6.

In the FIG. 8 arrangement, the unused labels are transferred from wheel 48 by pickup wheel 88 to label trough 92 where they may be stored for later use as described heretofore. Where it is desired to use labels 66' in trough 92, the vacuum controlling valve sequence of transfer wheel 48 and/or pickup wheel 88 may be changed to permit wheel 88 to withdraw labels 66' from trough 92 and transfer the labels to land 83 of transfer wheel 48 for application to articles 25.

While the invention has been described with reference to the structure disclosed herein, it is not confined to the details set forth; but is intended to cover such modifications or changes as may come within the scope of the following claims.

What is claimed is:

1. In an article labeling system including a labeling head with a movable label transfer wheel and means to feed articles to be labeled to said labeling head, the combination of:

a source of labels comprising a sheet-like form having bodies of label information thereon representing individual labels, said labels being arranged in at least one longitudinally extending row;

means for feeding said label form to said labeling head, said labeling head including means for separating said labels from said form to permit transfer of individual labels to said articles by said transfer wheel;

means for coating said labels with adhesive to enable physical transfer of said labels to said articles;

said label form including an integral control section paralleling said label row and adapted to bear control data for regulating operation of said label coating means; and means for operating said label coating means in response to said control data whereby to limit application of adhesive to those labels designated for physical transfer to said articles by said control data.

2. The article labeling apparatus according to claim 1 in which said label coating means includes applicator means for applying adhesive to said labels before said labels are brought into physical contact with said articles to permit said labels to be physically attached to said articles by said labeling head transfer wheel; said operating means including means for moving said applicator means to an inoperative position to prevent application of adhesive, and means for scanning said label form control section, said scanning means being adapted on a predetermined control mark to actuate said moving means and move said applicator means to said inoperative position so as to prevent application of adhesive to the label associated with said control mark whereby physical transfer of said label to an article is avoided.

3. The article labeling apparatus according to claim 2 including means for storing non-transferred labels.

References Cited

UNITED STATES PATENTS

| | | | |
|---|---|---|---|
| 2,681,743 | 6/1954 | Phin et al. | 156—357 |
| 2,920,780 | 1/1960 | Hauschild et al. | 156—361 |
| 3,341,390 | 9/1967 | Kirk | 156—528 X |

BENJAMIN A. BORCHELT, Primary Examiner

G. E. MONTONE, Assistant Examiner

U.S. Cl. X.R.

156—356, 361, 524, 525, 529